United States Patent
Kobayashi et al.

(10) Patent No.: US 8,896,870 B2
(45) Date of Patent: Nov. 25, 2014

(54) IMAGE FORMING SYSTEM, IMAGE FORMING APPARATUS, EXTERNAL TERMINAL, AND RECORDING MEDIUM

(71) Applicants: Minako Kobayashi, Ikeda (JP); Yoshio Komaki, Nishinomiya (JP); Junichi Hase, Hirano-ku (JP); Tomonari Yoshimura, Sakyo-ku (JP); Hiroki Tajima, Toyokawa (JP); Yoshiaki Shibuta, Amagasaki (JP)

(72) Inventors: Minako Kobayashi, Ikeda (JP); Yoshio Komaki, Nishinomiya (JP); Junichi Hase, Hirano-ku (JP); Tomonari Yoshimura, Sakyo-ku (JP); Hiroki Tajima, Toyokawa (JP); Yoshiaki Shibuta, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/789,715

(22) Filed: Mar. 8, 2013

(65) Prior Publication Data

US 2013/0258400 A1    Oct. 3, 2013

(30) Foreign Application Priority Data

Mar. 27, 2012    (JP) ................. 2012-070676

(51) Int. Cl.
G06F 3/12      (2006.01)
G06K 15/00    (2006.01)
H04N 1/00     (2006.01)

(52) U.S. Cl.
CPC ...... H04N 1/0049 (2013.01); *H04N 2201/0094* (2013.01); *H04N 2201/001* (2013.01); H04N 1/00408 (2013.01); *H04N 2201/0074* (2013.01); *H04N 1/00204* (2013.01)
USPC .......................... 358/1.15; 358/1.13; 358/1.16

(58) Field of Classification Search
None
See application file for complete search history.

(56) References Cited

U.S. PATENT DOCUMENTS

2004/0170460 A1* 9/2004 Mokuya et al. ................. 400/76
2005/0192051 A1    9/2005 Tokuhashi
(Continued)

FOREIGN PATENT DOCUMENTS

JP    05-122424        5/1993
JP    2002-086847 A    3/2002
(Continued)

OTHER PUBLICATIONS

Office Action (Notice of Reasons for Refusal) issued Jan. 7, 2014, by the Japanese Patent Office in corresponding Japanese Patent Application No. 2012-070676, and an English Translation of the Office Action. (5 pages).

(Continued)

*Primary Examiner* — Marivelisse Santiago Cordero
*Assistant Examiner* — Moustapha Diaby
(74) *Attorney, Agent, or Firm* — Buchanan Ingersoll & Rooney PC

(57) ABSTRACT

An image forming system comprises an image forming apparatus and an external terminal. The image forming apparatus has a receiving part for receiving operation input information on an operation input into an operation screen from the external terminal, a specifying part for specifying a first program to which an execution instruction is given through the operation screen on the basis of the operation input information, a determination part for determining a second program having the same function as that of the first program as an execution object program on the condition that the second program is installed in the external terminal, and a notification part for notifying the external terminal that the second program is determined as the execution object program. The external terminal executes a processing in accordance with the second program and displays a result of the processing executed in accordance with the second program.

12 Claims, 14 Drawing Sheets

(56) References Cited

U.S. PATENT DOCUMENTS

| | | | |
|---|---|---|---|
| 2006/0290680 A1* | 12/2006 | Tanaka et al. | 345/173 |
| 2006/0293765 A1* | 12/2006 | Tanaka et al. | 700/15 |
| 2013/0246509 A1 | 9/2013 | Sakiyama et al. | |

FOREIGN PATENT DOCUMENTS

| | | |
|---|---|---|
| JP | 2003-107962 A | 4/2003 |
| JP | 2004-295325 A | 10/2004 |
| JP | 2005-223438 A | 8/2005 |
| JP | 2006-092302 A | 4/2006 |
| JP | 2007-159057 A | 6/2007 |
| JP | 2007-318519 A | 12/2007 |
| JP | 2008-219351 A | 9/2008 |
| JP | 2009-105512 A | 5/2009 |
| JP | 2011-238006 A | 11/2011 |
| JP | 2013-191056 A | 9/2013 |
| JP | 2003-341174 A | 12/2013 |

OTHER PUBLICATIONS

Japanese Office Action (Decision to Grant) dated Aug. 5, 2014, issued by the Japanese Patent Office in corresponding Japanese Patent Application No. 2012-070676 (3 pages).

* cited by examiner

| PROGRAM MODULE | FUNCTION INFORMATION |
|---|---|
| ×××<br>(WEB BROWSING PROGRAM) | WEB BROWSING FUNCTION |
| ×××××<br>(PDF CREATION PROGRAM) | PDF CREATION FUNCTION |
| : | : |

| PARTS | POSITION INFORMATION | PROGRAM INFORMATION |
|---|---|---|
| : | : | : |
| : | : | : |
| ENTRY 1 | LP(X11, Y11)<br>RP(X12, Y12) | PG11<br>(WEB BROWSING FUNCTION) |
| ENTRY 2 | LP(X21, Y21)<br>RP(X22, Y22) | PG12<br>(PDF CREATION FUNCTION) |
| : | : | : |

# IMAGE FORMING SYSTEM, IMAGE FORMING APPARATUS, EXTERNAL TERMINAL, AND RECORDING MEDIUM

This application is based on Japanese Patent Application No. 2012-070676 filed on Mar. 27, 2012, the contents of which are hereby incorporated by reference.

BACKGROUND OF THE INVENTION

1. Field of the Invention

The present invention relates to an image forming system comprising an image forming apparatus such as an MFP (Multi-Functional Peripheral) and its relevant technique.

2. Description of the Background Art

There is a technique for operating an image forming apparatus by an external terminal.

Japanese Patent Application Laid Open Gazette No. 05-122424, for example, discloses a technique in which operation screen data itself (bitmap image data or the like) is transmitted from an image forming apparatus to an external terminal and an operation screen based on the data is displayed on a display part of the external terminal, and manipulation position information (press position information or the like) in the operation screen is sent/received to thereby receive an operation input into the operation screen. This is a remote operation technique utilizing a so-called remote connection.

In the above remote operation technique, however, operation screen data (in relatively large amount) itself has to be transmitted from the image forming apparatus to the external terminal in response to the operation input every time when the operation input is made, and this causes a problem that communication traffic increases in a network between the image forming apparatus and the external terminal.

SUMMARY OF THE INVENTION

It is an object of the present invention to provide an image forming system capable of reducing communication traffic in a network between an image forming apparatus and an external terminal and its relevant technique.

The present invention is intended for an image forming system. According to a first aspect of the present invention, the image forming system comprises an image forming apparatus and an external terminal capable of performing communication with the image forming apparatus. In the image forming system of the first aspect of the present invention, the image forming apparatus has a transmitting part for transmitting display data of an operation screen to be displayed on the external terminal to the external terminal, a receiving part for receiving operation input information on an operation input into the operation screen from the external terminal, a specifying part for specifying a first program to which an execution instruction is given through the operation screen, out of programs installed in the image forming apparatus, on the basis of the operation input information, a determination part for determining a second program having the same function as that of the first program, instead of the first program, as an execution object program on the condition that the second program is installed in the external terminal, and a notification part for notifying the external terminal that the second program is determined as the execution object program, and the external terminal has a display control part for displaying the operation screen on a display part of the external terminal on the basis of the display data transmitted from the image forming apparatus, a communication part for transmitting the operation input information on the operation input into the operation screen to the image forming apparatus, an execution control part for executing a processing in accordance with the second program when the external terminal is notified from the image forming apparatus that the second program is determined as the execution object program, and a generation part for generating a display screen for displaying therein a result of the processing executed in accordance with the second program.

The present invention is also intended for an image forming apparatus. According to a second aspect of the present invention, the image forming apparatus comprises a transmitting part for transmitting display data of an operation screen to be displayed on an external terminal which is capable of performing communication with the image forming apparatus to the external terminal, to thereby display the operation screen on a display part of the external terminal, a receiving part for receiving operation input information on an operation input into the operation screen from the external terminal, a specifying part for specifying a first program to which an execution instruction is given through the operation screen, out of programs installed in the image forming apparatus, on the basis of the operation input information, a determination part for determining a second program having the same function as that of the first program, instead of the first program, as an execution object program on the condition that the second program is installed in the external terminal, and a notification part for notifying the external terminal that the second program is determined as the execution object program, to thereby cause the external terminal to execute a processing in accordance with the second program and generate a display screen for displaying therein a result of the processing executed in accordance with the second program.

The present invention is still also intended for a non-transitory computer-readable recording medium. According to a third aspect of the present invention, the non-transitory computer-readable recording medium records therein a computer program to be executed by a computer embedded in an image forming apparatus to cause the computer to perform the steps of a) transmitting display data of an operation screen to be displayed on an external terminal which is capable of performing communication with the image forming apparatus to the external terminal, to thereby display the operation screen on a display part of the external terminal, b) receiving operation input information on an operation input into the operation screen from the external terminal, c) specifying a first program to which an execution instruction is given through the operation screen, out of programs installed in the image forming apparatus, on the basis of the operation input information, d) determining a second program having the same function as that of the first program, instead of the first program, as an execution object program on the condition that the second program is installed in the external terminal, and e) notifying the external terminal that the second program is determined as the execution object program, to thereby cause the external terminal to execute a processing in accordance with the second program and generate a display screen for displaying therein a result of the processing executed in accordance with the second program.

According to a fourth aspect of the present invention, an image forming system comprises an image forming apparatus and an external terminal capable of performing communication with the image forming apparatus. In the image forming system of the fourth aspect of the present invention, the image forming apparatus has a generation part for generating display data of an operation screen to be displayed on the external terminal and a transmitting part for transmitting the display data to the external terminal, and the external terminal has a display control part for displaying the operation screen on a display part of the external terminal on the basis of the display data transmitted from the image forming apparatus, a specifying part for specifying a first program to which an execution instruction is given through the operation screen, out of programs installed in the image forming apparatus, on the basis of operation input information on an operation input into the operation screen, a determination part for determining a second program having the same function as that of the first program, instead of the first program, as an execution object program on the condition that the second program is installed in the external terminal, an execution control part for executing a processing in accordance with the second program when the determination part determines the second program as the execution object program, and a generation part for generating a display screen for displaying therein a result of the processing executed in accordance with the second program.

The present invention is further intended for an external terminal capable of performing communication with an image forming apparatus. According to a fifth aspect of the present invention, the external terminal comprises a display control part for displaying an operation screen on a display part of the external terminal on the basis of display data of the operation screen transmitted from the image forming apparatus, a specifying part for specifying a first program to which an execution instruction is given through the operation screen, out of programs installed in the image forming apparatus, on the basis of operation input information on an operation input into the operation screen, a determination part for determining a second program having the same function as that of the first program, instead of the first program, as an execution object program on the condition that the second program is installed in the external terminal, an execution control part for executing a processing in accordance with the second program when the determination part determines the second program as the execution object program, and a generation part for generating a display screen for displaying therein a result of the processing executed in accordance with the second program.

According to a sixth aspect of the present invention, a non-transitory computer-readable recording medium records therein a computer program to be executed by a computer embedded in an image forming apparatus to cause the computer to perform the steps of a) displaying an operation screen on a display part of an external terminal on the basis of display data of the operation screen transmitted from the image forming apparatus capable of performing communication with the external terminal, b) specifying a first program to which an execution instruction is given through the operation screen, out of programs installed in the image forming apparatus, on the basis of operation input information on an operation input into the operation screen, c) determining a second program having the same function as that of the first program, instead of the first program, as an execution object program on the condition that the second program is installed in the external terminal, and d) executing a processing in accordance with the second program in response to determining the second program as the execution object program and generating a display screen for displaying therein a result of the processing executed in accordance with the second program.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view showing function information;

FIG. 14 is a view showing parts association information.

DESCRIPTION OF THE PREFERRED EMBODIMENTS

<1. The First Preferred Embodiment>
<1-1. Overall Configuration>

Figure 1:
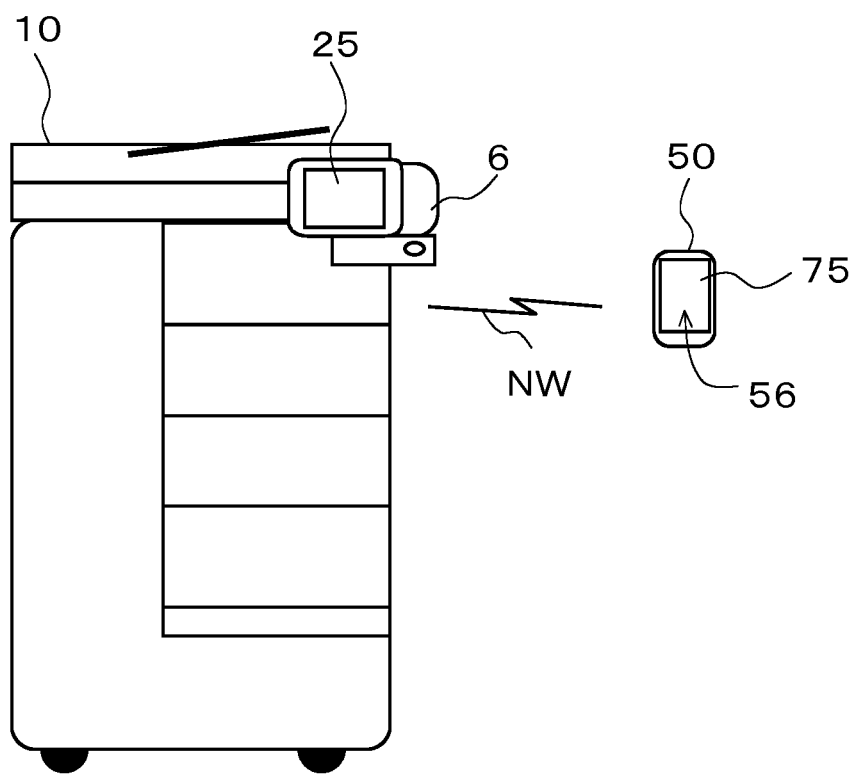
FIG. 1 is a view showing an image forming system in accordance with a first preferred embodiment.

FIG. 1 is a view showing an image forming system 1. As shown in FIG. 1, the image forming system 1 comprises an image forming apparatus 10 and an external terminal device 50.

The image forming apparatus 10 and the external terminal device (referred to simply as an "external terminal") 50 are communicably connected to each other via a network NW. The network NW includes a LAN (Local Area Network), the internet, and the like. Between the image forming apparatus 10 and the external terminal 50, for example, established is wireless connection through the network NW (including wireless LAN and the like).

The external terminal 50 is a device capable of (remotely) operating the image forming apparatus 10. A user of the image forming system 1 can perform various operations on the image forming apparatus 10 by using the external terminal 50. The external terminal 50 is also referred to as an operation apparatus (or a remote operation apparatus) or the like.

<1-2. Constitution of Image Forming Apparatus 10>

Figure 2:
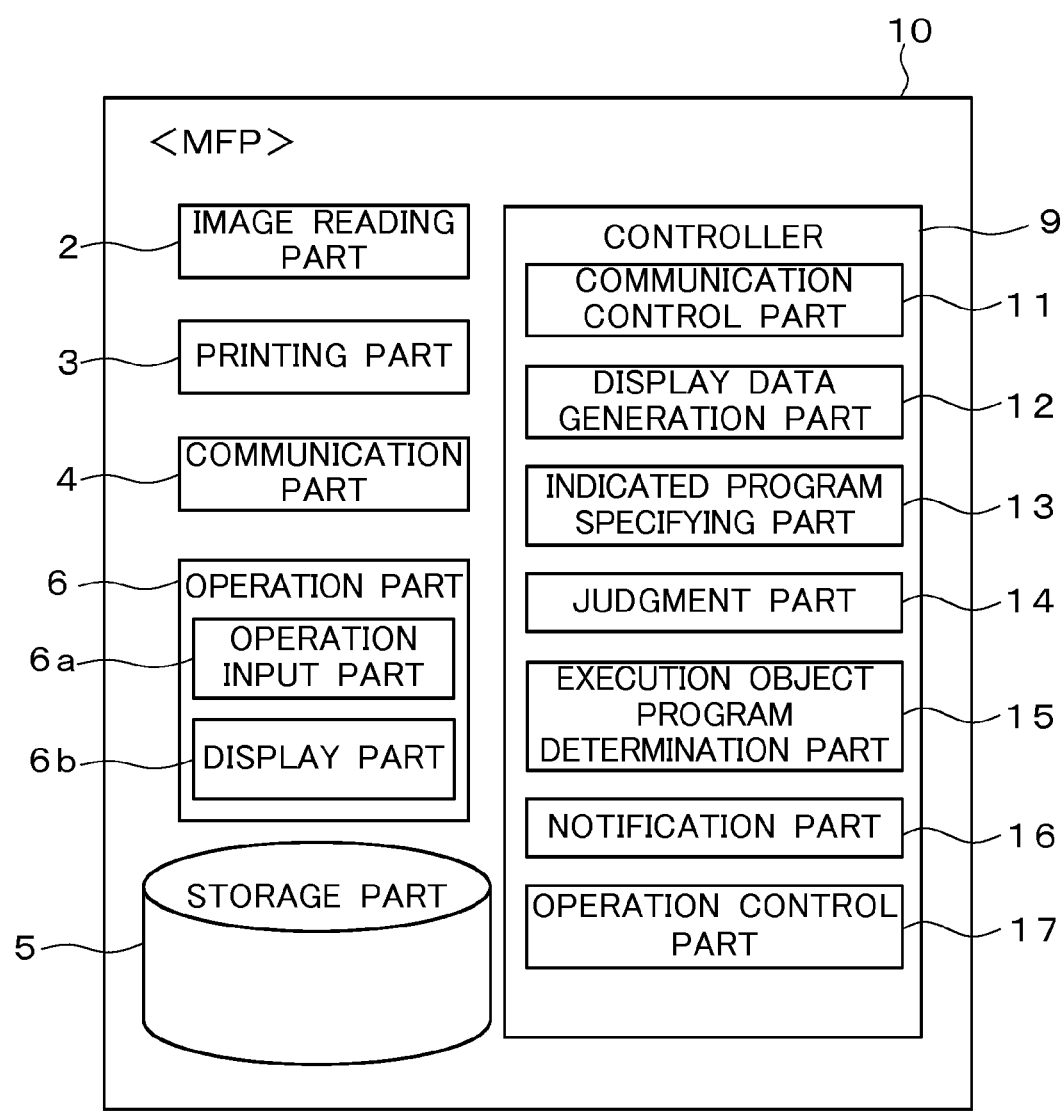
FIG. 2 is a view showing function blocks of an image forming apparatus.

FIG. 2 is a view showing function blocks of the image forming apparatus 10. Herein, as an example of the image forming apparatus 10, shown is an MFP (Multi-Functional Peripheral). FIG. 2 shows function blocks of an MFP 10.

The MFP 10 is an apparatus (also referred to as a multifunction machine) having a scanner function, a copy function, a facsimile function, a box storage function, and the like. Specifically, as shown in the functional block diagram of FIG. 2, the MFP 10 comprises an image reading part 2, a printing part 3, a communication part 4, a storage part 5, an operation part 6, a controller 9, and the like and multiply uses these constituent parts to implement various functions.

The image reading part 2 is a processing part which optically reads (in other words, scans) an original manuscript placed on a predetermined position of the MFP 10 and generates image data of the original manuscript (also referred to as an "original manuscript image" or a "scan image"). The image reading part 2 is also referred to as a scanning part.

The printing part 3 is an output part which prints out an image to various media such as paper on the basis of the data on an object to be printed.

The communication part 4 is a processing part capable of performing facsimile communication via public networks or the like. Further, the communication part 4 is capable of performing network communication via the network NW. The network communication uses various protocols such as TCP/IP (Transmission Control Protocol/Internet Protocol) and the like. By using the network communication, the MFP 10 can transmit and receive various data to/from desired partners (for example, the external terminal 50).

The communication part 4 has a transmitting part and a receiving part.

Figure 7:
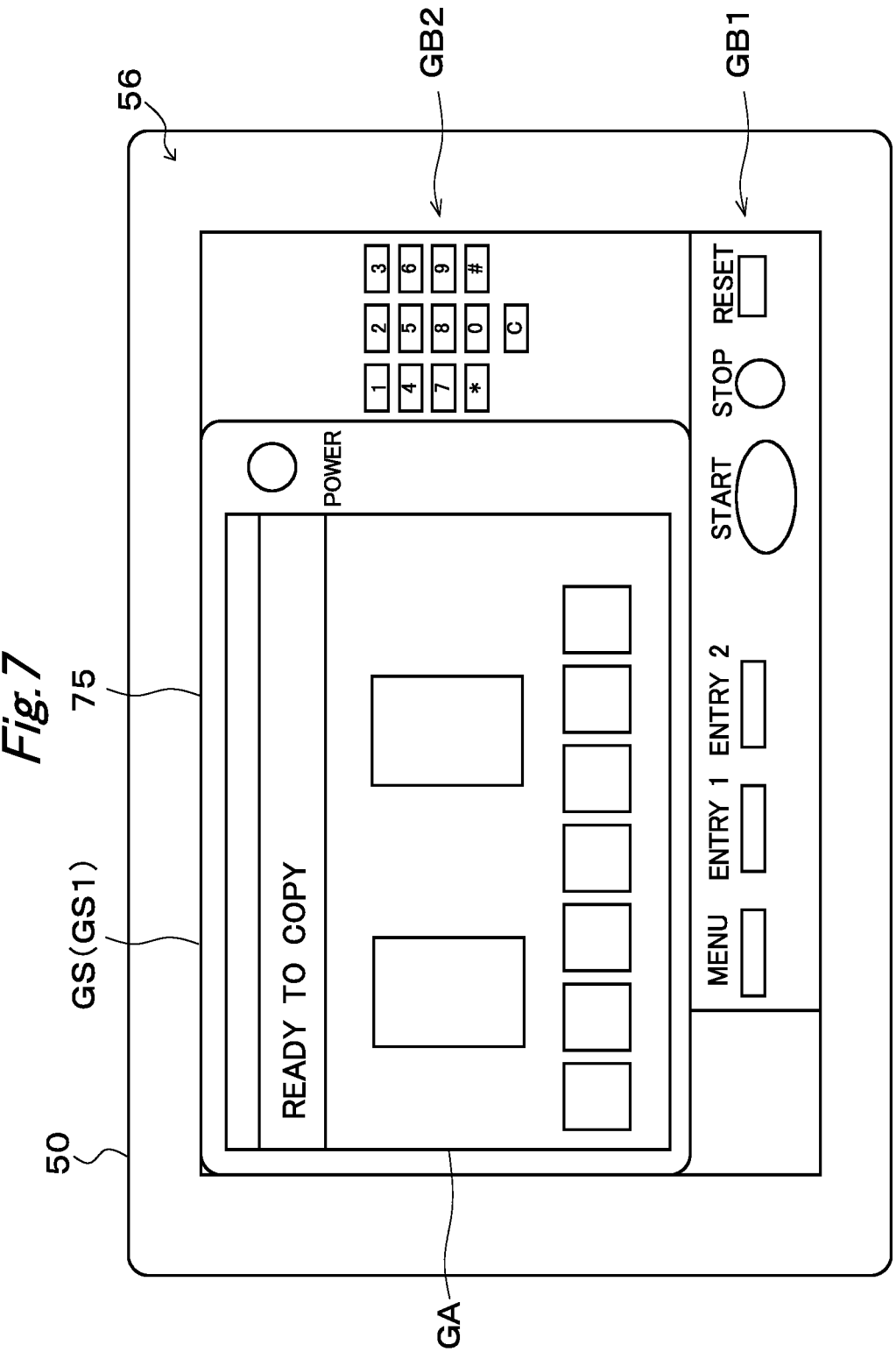
FIG. 7 is a plan view showing the external terminal.

The communication part 4 (in more detail, the transmitting part thereof) sends display data DT of an operation screen GS to be displayed on the external terminal 50 to the external terminal 50, to thereby display the operation screen GS on a display part of the external terminal 50 (see FIG. 7).

The communication part 4 (in more detail, the receiving part thereof) receives information (hereinafter, also referred to as operation input information) EM on an operation input into the operation screen GS from the external terminal 50.

The communication part 4 (in more detail, the receiving part thereof) further receives information (hereinafter, also referred to as function information) FJ (see FIG. 4) on a function (in more detail, the type of the function) of each of programs installed in the external terminal 50 from the external terminal 50.

FIG. 4 is a view showing the function information FJ received from the external terminal 50. The function information FJ records "function information" of each of programs (in more detail, application software programs) PG21, PG22, . . . (described later) which are installed in the external terminal 50. For example, in the first line of the function information FJ shown in FIG. 5, "(WEB) browsing function" is recorded as "function information" of the program PG21. Further, in the second line of the function information FJ shown in FIG. 5, "PDF creation function (PDF file creation function)" is recorded as "function information" of the program PG22.

The storage part 5 is a storage unit such as a hard disk drive (HDD) or/and the like. The storage part 5 stores therein data relevant to printing jobs and the like.

The operation part 6 comprises an operation input part 6a for receiving an input which is given to the MFP 10 and a display part 6b for displaying various information thereon. The MFP 10 is provided with a touch panel (also referred to as a touch screen) 25 (see FIG. 1) which is a liquid crystal display panel in which a piezoelectric sensor or the like is embedded. The touch panel 25 serves as part of the operation input part 6a and also serves as part of the display part 6b.

The controller 9 is a control unit for generally controlling the MFP 10. The controller 9 is a computer system which is embedded in the MFP 10 and comprises a CPU, various semiconductor memories (RAM and ROM), and the like. The controller 9 causes the CPU to execute a predetermined program (software program) PG1 stored in the ROM (e.g., EEPROM), to thereby implement various processing parts. Further, the program PG1 may be acquired via various portable (in other words, non-transitory) computer-readable recording media such as a USB memory or the like or via the network NW or the like and installed into the MFP 10.

Herein, it is assumed that programs (application software programs) other than the above-described program PG1, which can operate independently of the program PG1, i.e., a program PG11 (browser program), a program PG12 (PDF creation program), . . . and the like are also installed in the image forming apparatus 10. This is only one exemplary case, however, and the programs PG11, PG12, . . . and the like may be installed in the image forming apparatus 10 as program modules (submodules) constituting the program PG1.

Specifically, as shown in FIG. 2, the controller 9 executes the program PG1, to thereby implement various processing parts including a communication control part 11, a display data generation part 12, an indicated program specifying part 13, a judgment part 14, an execution object program determination part 15, a notification part 16, and an operation control part 17.

The communication control part 11 is a processing part for controlling a communication with other apparatus(es) (the external terminal 50 or/and the like).

The display data generation part 12 is a processing part for generating display data DT of an operation screen GS (see FIG. 7) to be displayed on the external terminal 50.

The indicated program specifying part 13 is a processing part for specifying a program PM1 to which an execution instruction is given through the operation screen GS, out of the programs installed in the image forming apparatus 10, as an indicated program on the basis of the operation input information EM.

The judgment part 14 is a processing part for judging whether or not a program PM2 having the same function as that of the program PM1 is installed in the external terminal 50. In more detail, the judgment part 14 judges whether or not the program PM2 having the main function as that of the program PM1 is installed in the external terminal 50. Specifically, the judgment part 14 judges whether or not the program PM2 is installed in the external terminal 50 on the basis of the function information FJ received from the external terminal 50.

The execution object program determination part 15 is a processing part for determining the program PM2 as an execution object program, instead of the program PM1, on the condition that the program PG2 having the same function as that of the program PM1 is installed in the external terminal 50.

The notification part 16 is a processing part for notifying the external terminal 50 that the program PM2 is determined as an execution object program. The notification part 16 is also a processing part for causing the external terminal 50, through this notification, to execute the processing in accordance with the program PM2 and generate a display screen for displaying therein a result of the processing executed in accordance with the program PM2.

The operation control part 17 controls various operations such as a printing operation and the like of the image forming apparatus 10. The operation control part 17 controls various operations on the basis of an operation input through the operation part 6 of the image forming apparatus 10 and an operation input through an operation part 56 of the external terminal 50.

<1-3. Constitution of External Terminal 50>

Next, discussion will be made on a constitution of the external terminal 50. Herein, as an example of the external terminal 50, shown is a portable terminal, in more detail, a tablet terminal. The external terminal 50, however, is not limited to this but may be a smartphone, a personal computer, or the like. Further, the external terminal 50 may be a portable device or a stationary device.

Figure 3:
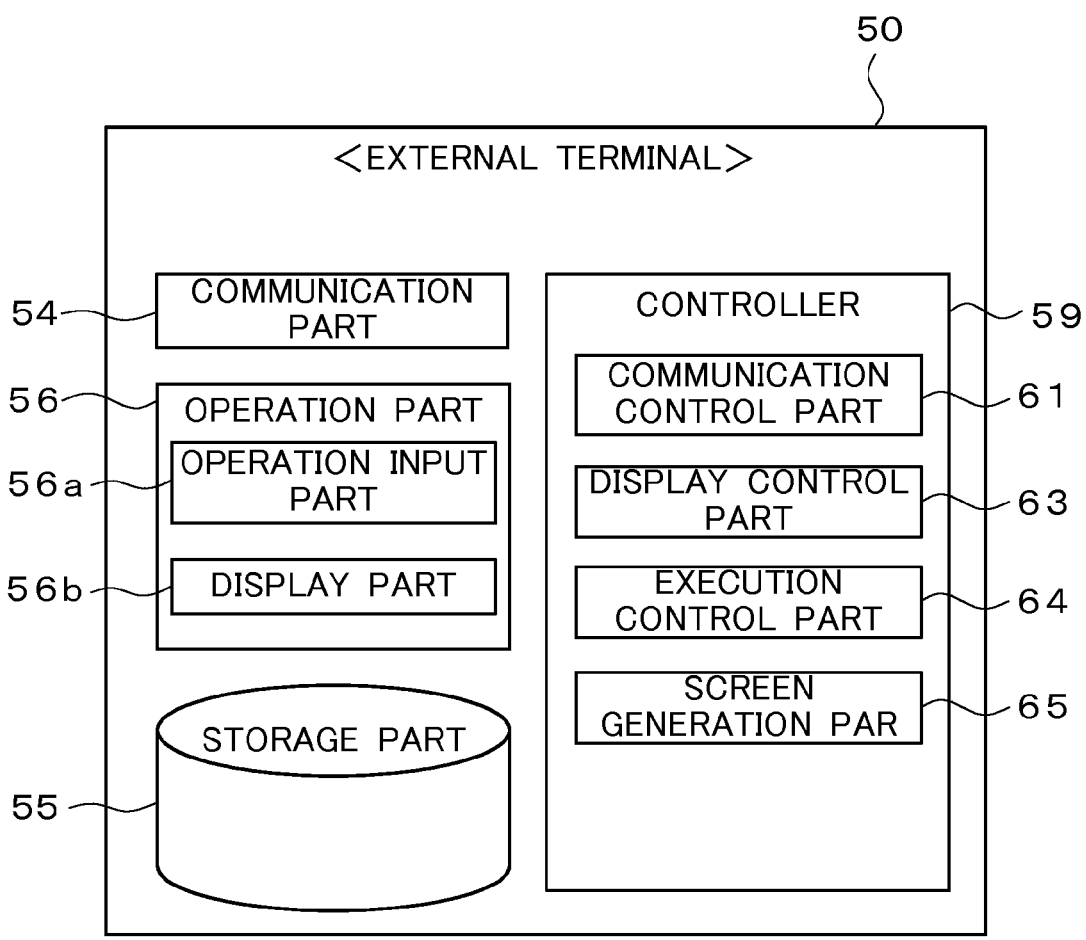
FIG. 3 is a view showing function blocks of an external terminal.

FIG. 3 is a functional block diagram showing a schematic constitution of the external terminal 50.

As shown in the functional block diagram of FIG. 3, the external terminal 50 comprises a communication part 54, a storage part 55, an operation part 56, a controller 59, and the like and multiply uses these constituent parts to implement various functions.

The communication part 54 is capable of performing network communication via the network NW. The network communication uses various protocols such as TCP/IP (Transmission Control Protocol/Internet Protocol) and the like. By using the network communication, the external terminal 50 can transmit and receive various data to/from desired partners (the image forming apparatus 10 or/and the like).

The communication part 54 has a transmitting part and a receiving part, and transmits and receives operation information or/and the like on the image forming apparatus 10 to/from the image forming apparatus 10.

The communication part 54 (in more detail, the receiving part thereof) receives, for example, the display data DT of the operation screen GS from the image forming apparatus 10.

The communication part 54 (in more detail, the transmitting part thereof) sends the function information FJ (see FIG. 4) to the image forming apparatus 10.

Further, the communication part 54 (in more detail, the transmitting part thereof) sends the operation input information EM on the operation input into the operation screen GS to the image forming apparatus 10.

The storage part 55 is a storage unit such as a nonvolatile semiconductor memory or the like.

The operation part 56 comprises an operation input part 56a for receiving an input which is given to the external terminal 50 and a display part 56b for displaying various information thereon. The external terminal 50 is provided with a touch panel (touch screen) 75 (see FIG. 1) which is a liquid crystal display panel in which a piezoelectric sensor or the like is embedded. The touch panel 75 serves as part of the operation input part 56a and also serves as part of the display part 56b.

As discussed later, on the display part 56b (the touch panel 75), displayed is an image (see FIGS. 7 to 10 and the like) representing a screen similar to the operation part 6 of the image forming apparatus 10.

The controller 59 is a control unit for generally controlling the external terminal 50. The controller 59 is a computer system which is embedded in the external terminal 50 and comprises a CPU, various semiconductor memories (RAM and ROM), and the like. The controller 59 causes the CPU to execute a predetermined software program (hereinafter, also referred to simply as a "program") PG2 stored in a memory part (semiconductor memory or the like), to thereby implement various processing parts. Further, the program PG2 may be acquired via various portable (in other words, non-transitory) computer-readable recording media such as a USB memory or the like or via the network NW or the like and installed into the external terminal 50.

Further, a plurality of programs (application programs and the like) other than the program PG2 may be installed in the external terminal 50. Herein, it is assumed that a program PG21 (browser program), a program PG22 (PDF creation program), . . . and the like which can operate independently of the program PG2 are also installed in the external terminal 50.

Specifically, as shown in FIG. 3, the controller 59 executes the program PG2, to thereby implement various processing parts including a communication control part 61, a display control part 63, an execution control part 64, and a screen generation part 65.

The communication control part 61 is a processing part for controlling a communication with the image forming apparatus 10 and the like in cooperation with the communication part 54 and the like.

The display control part 63 is a processing part for controlling a display operation on the display part 56b (the touch panel 75 and the like). For example, the display control part 63 generates an operation screen GS on the basis of the display data (bitmap image data and the like) DT of the operation screen GS transmitted from the image forming apparatus 10 and displays the operation screen GS on the touch panel 75.

The execution control part 64 is a processing part for executing a processing in accordance with the program PM2 in response to determining the program PM2 as the execution object program.

The screen generation part 65 is a processing part for generating a display screen for displaying therein a result of the processing executed in accordance with the program PM2 when the screen generation part 65 is notified that the program PM2 is determined as the execution object program.

<1-4. Constitution of Operation Part in Image Forming Apparatus 10>

Figure 6:
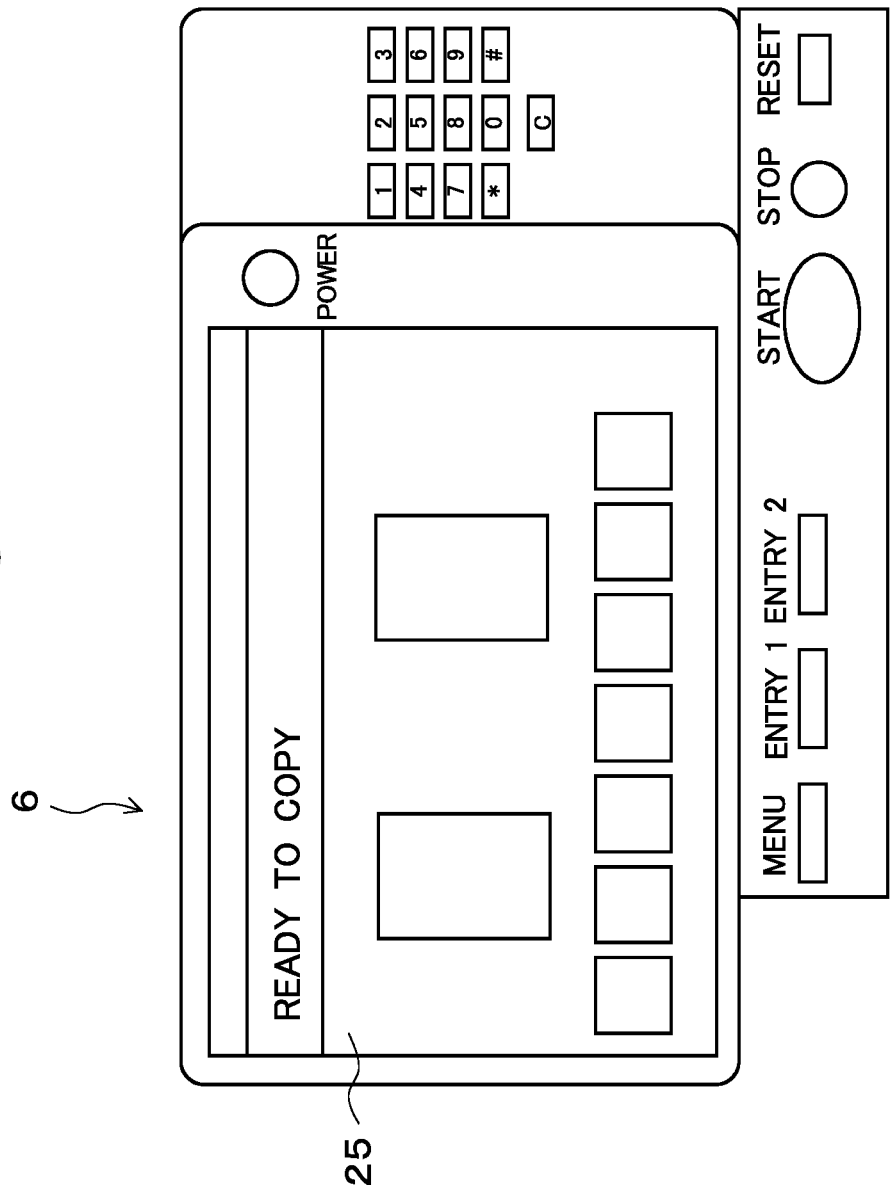
FIG. 6 is a plan view showing an operation part of the image forming apparatus.

FIG. 6 is a plan view showing a detailed configuration of the operation part 6 of the image forming apparatus 10 (see FIG. 1). As shown in FIG. 6, the operation part 6 has a rectangular touch panel 25 on a front side thereof.

On the touch panel 25, displayed are various menu images (including key images and the like). By pressing any one of software keys (also referred to as software buttons) represented by keys (key images) (also referred to as button images) which are virtually arranged on the touch panel 25, an operator can give various operation inputs to the image forming apparatus 10 and set various operation contents of the image forming apparatus 10.

Around the touch panel 25 (herein, in a partial area of the right side and the lower side), provided are hardware keys (also referred to as hardware buttons) such as a power key, a ten key, a menu key, entry (entry 1 and entry 2) keys, a start key, a stop key, a reset key, and the like. Also by pressing any one of these hardware keys, the operator can give various operation inputs to the image forming apparatus 10.

Each of the entry keys is a key for giving an execution instruction for a program having a specific function through the operation screen GS.

Herein, the browsing program PG11 having a WEB browsing function is set to the "Entry 1" key, and by pressing the "Entry 1" key, the operator can give an execution instruction of the program PG11.

Further, the PDF creation program PG12 having a PDF creation function is set to the "Entry 2" key, and by pressing the "Entry 2" key, the operator can give an execution instruction of the program PG12. The PDF creation function is a function for creating a data file having a PDF (Portable Document Format) format on the basis of the screen displayed on the touch panel 25.

<1-5. Constitution of Operation Part in External Terminal 50>

FIG. 7 is a plan view showing a detailed configuration of the external terminal 50 (in more detail, the operation part 56). As shown in FIG. 7, the external terminal 50 comprises the operation part 56 on a front surface thereof. Specifically, the rectangular touch panel 75 is provided almost entirely on a front surface side of the substantially plate-like external terminal 50, except a peripheral portion (frame portion) thereof.

As shown in FIG. 7, on the touch panel 75 in the operation part 56 of the external terminal 50 in a state where the external terminal 50 is connected communicably with the image forming apparatus 10, displayed is the operation screen GS (GS1) representing the operation part 6 (see FIG. 6) of the image forming apparatus 10.

The operation screen GS comprises a touch panel image GA and a hardware image GB.

In the touch panel image GA, like in the image of the touch panel 25, provided are software keys. When an operation input using any one of the software keys is received, the external terminal 50 sends the operation input information EM (in more detail, press position information and the like) to the image forming apparatus 10. When the image forming apparatus 10 receives the operation input information EM, the image forming apparatus 10 performs a processing in accordance with the operation input using the software key.

In the hardware image GB, provided is a hardware key image simulating the hardware keys in the operation part 6 of the image forming apparatus 10 or/and the like. When a press operation on the hardware key image in the hardware image GB is received, the external terminal 50 sends the operation input information EM (in more detail, the press position information and the like) to the image forming apparatus 10. When the image forming apparatus 10 receives the operation input information EM, the image forming apparatus 10 performs a processing in accordance with the operation input using the hardware key image.

<1-6. Operation>

Figure 5:
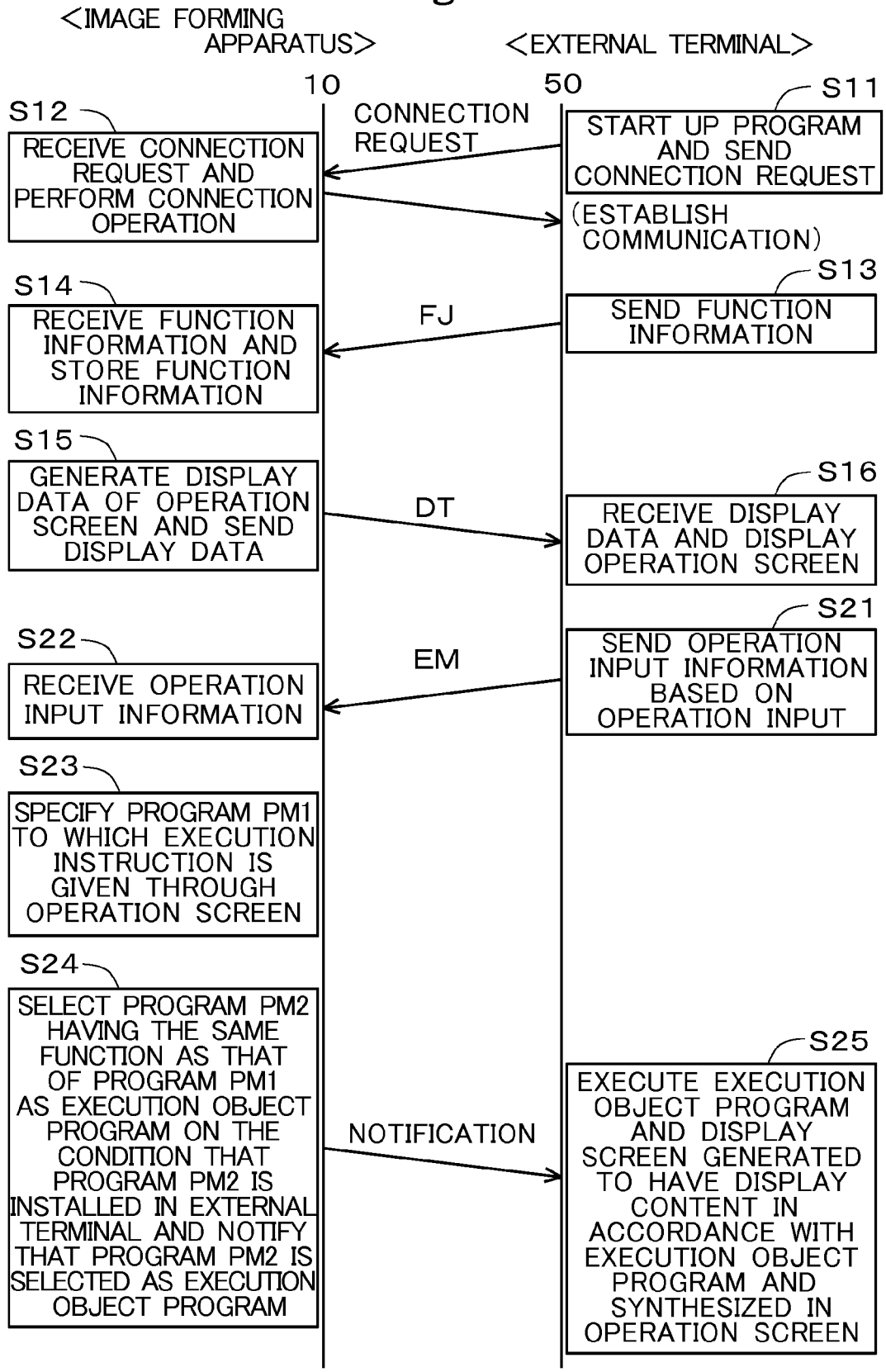
FIG. 5 is a flowchart showing an operation of the image forming system.

FIG. 5 is a flowchart showing an operation of the image forming system 1. With reference to FIG. 5, discussion will be made on the operation of the image forming system 1.

First, when the program PG2, in more detail, a program module (one of a plurality of program modules constituting the program PG2) for performing a remote operation of the image forming apparatus 10 is started up in the external terminal 50, the external terminal 50 sends a connection request to the image forming apparatus 10 (Step S11). The image forming apparatus 10 performs a connection operation with the external terminal 50 in response to the connection request (Step S12). This establishes communication connection between the image forming apparatus 10 and the external terminal 50.

After that, the external terminal 50 sends the function information FJ (see FIG. 4) to the image forming apparatus 10 (Step S13). The image forming apparatus 10 receives the function information FJ from the external terminal 50 and stores the function information FJ into the storage part 5 (Step S14).

Next, the image forming apparatus 10 generates the display data DT of the operation screen GS (GS1) to be displayed on the external terminal 50 and sends the display data DT to the external terminal 50 (Step S15). The external terminal 50 generates the operation screen GS1 shown in FIG. 7 on the basis of the display data DT transmitted from the image forming apparatus 10 and displays the operation screen GS1 on the touch panel 75 (Step S16).

After that, the external terminal 50 enters a standby state WS1 for waiting for an operation input from the operator.

Herein, assuming that an operation input of pressing the "Entry 1" key in the operation screen GS1 is received in the above-discussed standby state WS1, discussion will be made on the operations of Step S21 and the following steps shown in FIG. 5.

When the "Entry 1" key in the operation screen GS1 (see FIG. 7) is pressed, the external terminal 50 sends the operation input information EM to the image forming apparatus 10 (Step S21). The image forming apparatus 10 receives the operation input information EM from the external terminal 50 (Step S22) and specifies the program PM1 to which the execution instruction is given through the operation screen GS on the basis of the operation input information EM (Step S23). In other words, the image forming apparatus 10 specifies a program (also referred to as an "indicated program") which is indicated by the execution instruction. As discussed above, since the program PG11 having the WEB browsing function is set to the "Entry 1" key, the program PG1 (PM1) is specified as the indicated program herein.

After that, the image forming apparatus 10 judges whether or not the program PM2 having the same function (in more detail, the WEB browsing function) as that of the program PG11 is installed in the external terminal 50 on the basis of the function information FJ.

Specifically, the image forming apparatus 10 judges whether or not the program PM2 having the same function (the WEB browsing function) as that of the program PG11 (PM1) is installed in the external terminal 50 with reference to the "function information" of the program recorded in the function information FJ. Herein, as shown in the function information FJ of FIG. 4, since the program PG21 whose "function information" is "WEB browsing function" is present in the function information FJ, it is judged that the program PG21 (PM2) having the same function as that of the program PG11 (PM1) is installed in the external terminal 50.

Then, the image forming apparatus 10 determines the program PG21 (PM2), instead of the program PG11 (PM1) which is the indicated program, as the execution object program, and notifies the external terminal 50 that the program PG21 is determined as the execution object program (Step S24).

Figure 8:
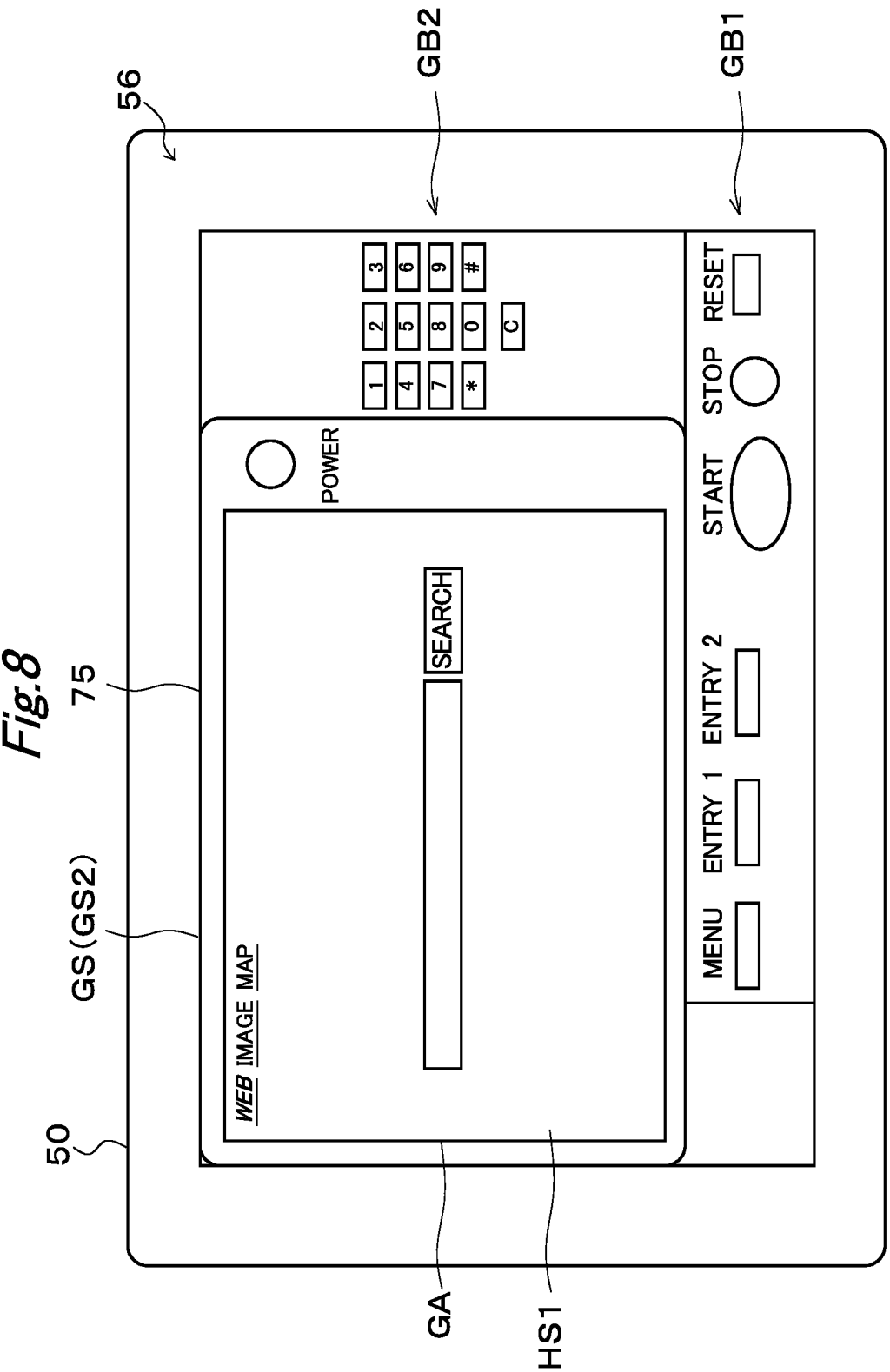
FIGS. 8 to 10 are views each showing an operation screen of the external terminal.

In response to this, the external terminal 50 executes the program PG21 (PM2) and generates a WEB browser screen HS1 (a display screen for displaying a result of the processing (browsing operation) executed in accordance with the program PG21). Then, the external terminal 50 displays a new operation screen GS2 on the touch panel 75 (Step S25) as shown in FIG. 8. The operation screen GS2 is a screen in which the WEB browser screen HS1 is synthesized in the operation screen GS1 (in more detail, in the area of the touch panel image GA).

Figure 9:
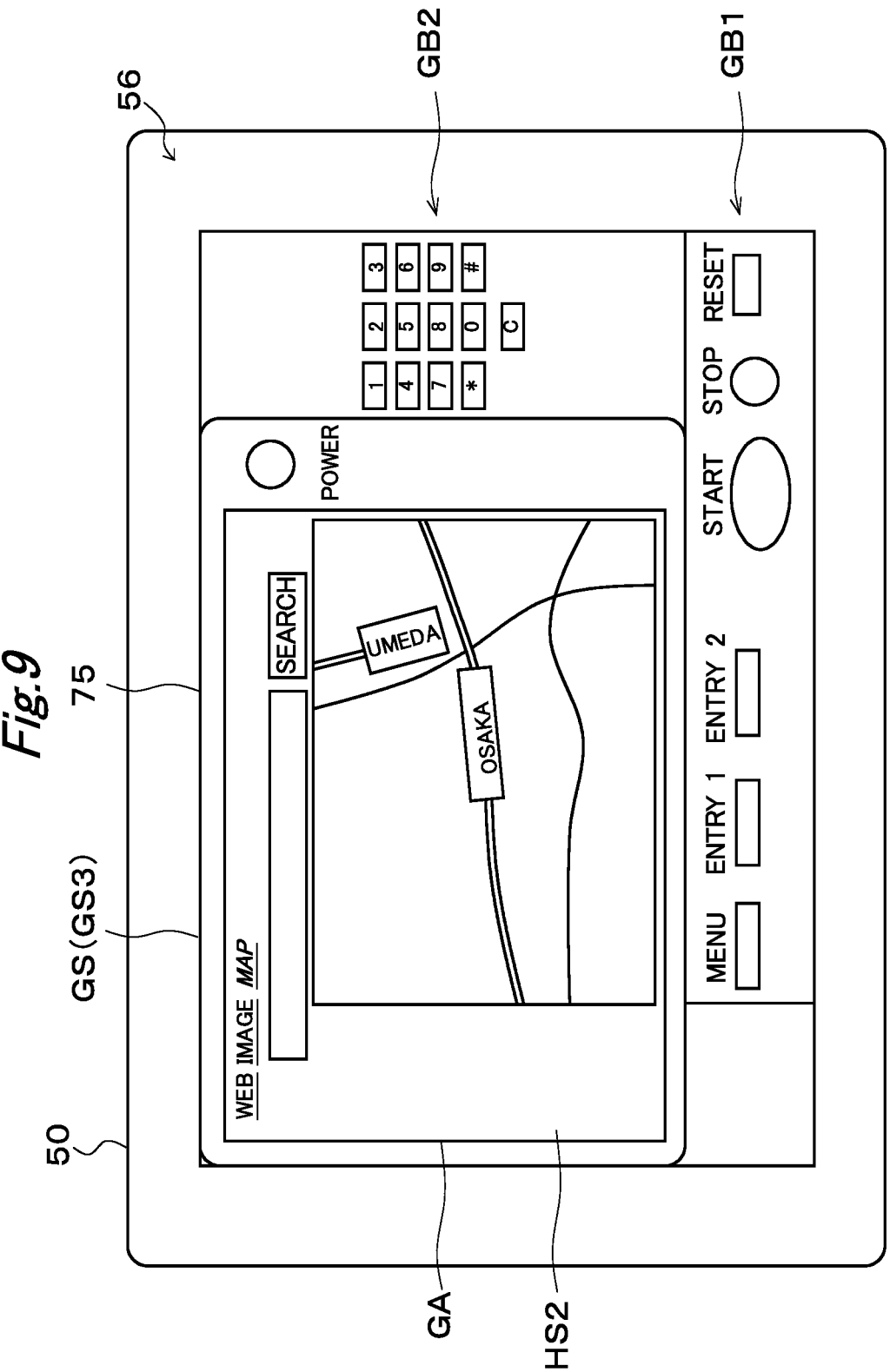
Figure 10:
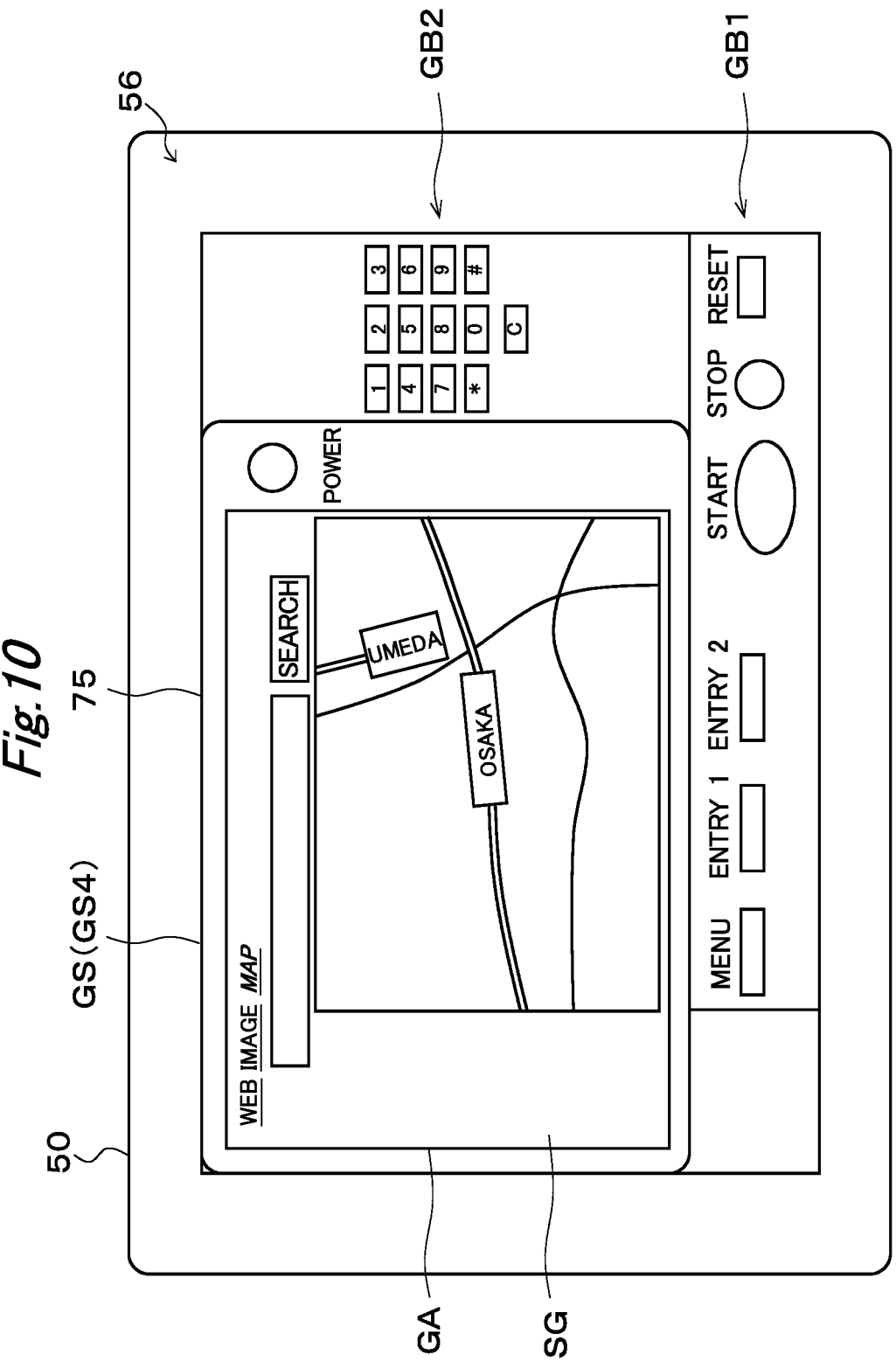

After that, when an operation input into the WEB browser screen HS1 is received, the external terminal 50 performs a browsing operation in accordance with the program PG21. When an operation input instructing the WEB browser screen HS1 to display a map site is received, for example, the image forming apparatus 10 displays a new operation screen GS3 on the touch panel 75 as shown in FIG. 9. The operation screen GS3 is a screen in which a WEB browser screen HS2 on the map site is synthesized in the area of the touch panel image GA.

In a case where a browsing operation is performed in accordance with the program PG11 (PM1) installed in the image forming apparatus 10, data of a display screen for displaying the processing result is transmitted from the image forming apparatus 10 to the external terminal 50, and the processing result is thereby displayed on the external terminal 50. In other words, in order for the user to view the result of the browsing operation on the external terminal 50, it is necessary to transmit the display screen data for displaying the result of the browsing operation from the image forming apparatus 10 to the external terminal 50.

In contrast to the above case, in the present preferred embodiment, the browsing operation is performed in the external terminal 50 in accordance with the program PG21 (PM2) installed in the external terminal 50, and the data of the display screen for displaying the result of the browsing operation is generated in the external terminal 50. For this reason, it is not necessary to transmit the data of the display screen for displaying the browsing operation from the image forming apparatus 10 to the external terminal 50 in order for the user to view the result of the browsing operation on the external terminal 50. Therefore, it is possible to reduce the communication traffic between the image forming apparatus 10 and the external terminal 50.

Herein, it is assumed that the "Entry 2" key in the operation screen GS3 (FIG. 9) is pressed.

When the "Entry 2" key in the operation screen GS3 is pressed, the above-discussed Steps S21 to S25 are executed again.

Specifically, the external terminal 50 sends the operation input information EM to the image forming apparatus 10 (Step S21), and the image forming apparatus 10 receives the operation input information EM from the external terminal 50 (Step S22).

Then, the image forming apparatus 10 specifies the program PM1 to which an operation input is given through the operation screen GS3, as the indicated program on the basis of the operation input information EM (Step S23). As discussed above, since the program PG12 having the PDF creation function is set to the "Entry 2" key, the program PG12 (PM1) is specified as the indicated program herein.

After that, the image forming apparatus 10 judges whether or not the program PM2 having the same function (in more detail, the PDF creation function) as that of the program PG12 (PM1) is installed in the external terminal 50 on the basis of the function information FJ.

Herein, as shown in the function information FJ of FIG. 4, since the program PG22 whose "function information" is "PDF creation function" is present in the function information FJ, it is judged that the program PG22 (PM2) having the same function as that of the program PG12 (PM1) is installed in the external terminal 50.

Then, the image forming apparatus 10 determines the program PG22 (PM2), instead of the program PG12 (PM1) which is the indicated program, as the execution object program, and notifies the external terminal 50 that the program PG22 is determined as the execution object program (Step S24).

In response to this, the external terminal 50 executes the program PG22 (PM2) to create a file FL in the PDF format on the basis of the display screen (in more detail, the WEB browser screen HS2) on the touch panel 25, and stores the file FL into a predetermined storage destination (the storage part 55). Further, the external terminal 50 displays a new operation screen GS4 on the touch panel 75 (see FIG. 10). The operation screen GS4 is a screen in which an image SG of the WEB browser screen HS2 in the PDF format is synthesized in the operation screen GS3.

If it is judged that the program PM2 having the same function as the program PM1 is not installed in the external terminal 50, the image forming apparatus 10 determines the indicated program itself as the execution object program. In other words, the image forming apparatus 10 executes the program PM1 in the same manner as a normal remote operation. Then, the image forming apparatus 10 generates a display screen for displaying the result of the processing in accordance with the program PM1 and sends the display screen (in more detail, the display data of the display screen) to the external terminal 50.

In accordance with the above operations, the program PM1 (PG11, PG12) installed in the image forming apparatus 10 is specified as the indicated program. Then, on the condition that the program PM2 (PG21, PG22) having the same function (the WEB browsing function, the PDF creation function) as that of the program PM1 (PG11, PG12) is installed in the external terminal 50, the program PM2 (PG21, PG22), instead of the program PM1 (PG11, PG12), is determined as the execution object program. Then, the external terminal 50 performs the processing in accordance with the program PM2 (PG21, PG22) and generates a display screen (HS1, SG) for displaying the result of the processing executed in accordance with the program PM2. For this reason, when the program PM2 (PG21, PG22) is installed in the external terminal 50, it is possible to avoid execution of the program PM1 (PG11, PG12) by the image forming apparatus 10. Therefore, it is not necessary to transmit the data of the display screen for displaying the result of the processing executed in accordance with the program PM1 (PG11, PG12) from the image forming apparatus 10 to the external terminal 50, and it is therefore possible to reduce the communication traffic in the network NW between the image forming apparatus 10 and the external terminal 50.

<2. The Second Preferred Embodiment>

The second preferred embodiment is a variation of the first preferred embodiment.

Discussion will be made below, centering on the difference between the first and second preferred embodiments.

The above-discussed first preferred embodiment shows the case where the image forming apparatus 10 judges whether or not the program PM2 having the same function as that of the program PM1 to which the execution instruction is given through the operation screen GS is installed in the external terminal 50.

On the other hand, the second preferred embodiment will show a case where the external terminal 50 itself makes this judgment.

Figure 11:
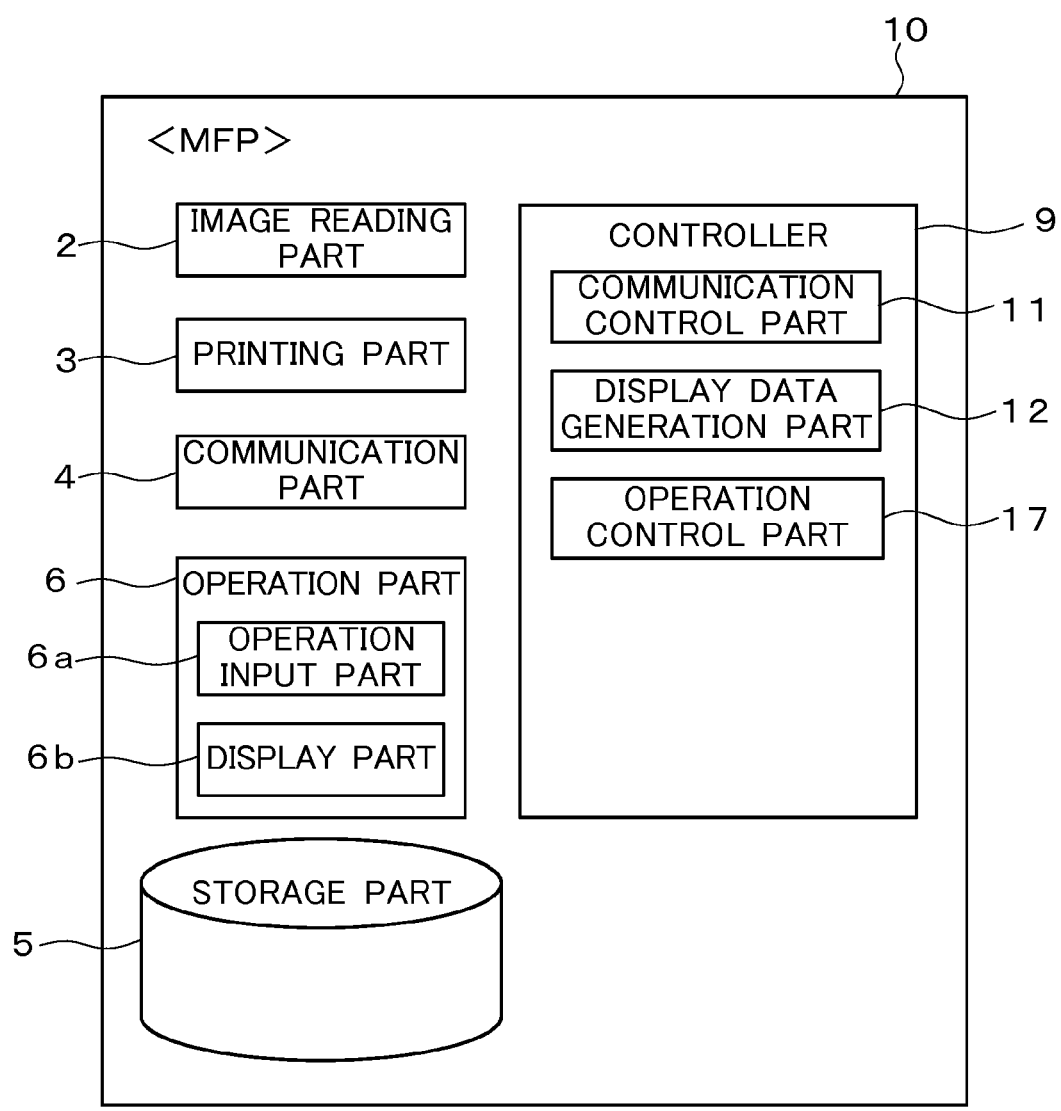
FIG. 11 is a view showing function blocks of an image forming apparatus in accordance with a second preferred embodiment.

FIG. 11 is a view showing function blocks of an image forming apparatus 10 in accordance with the second preferred embodiment.

As shown in FIG. 11, in the second preferred embodiment, the controller 9 implements various processing parts including the communication control part 11, the display data generation part 12, and the operation control part 17. The processing parts 11, 12, and 17 perform the same operations as those in the first preferred embodiment, respectively.

Figure 12:
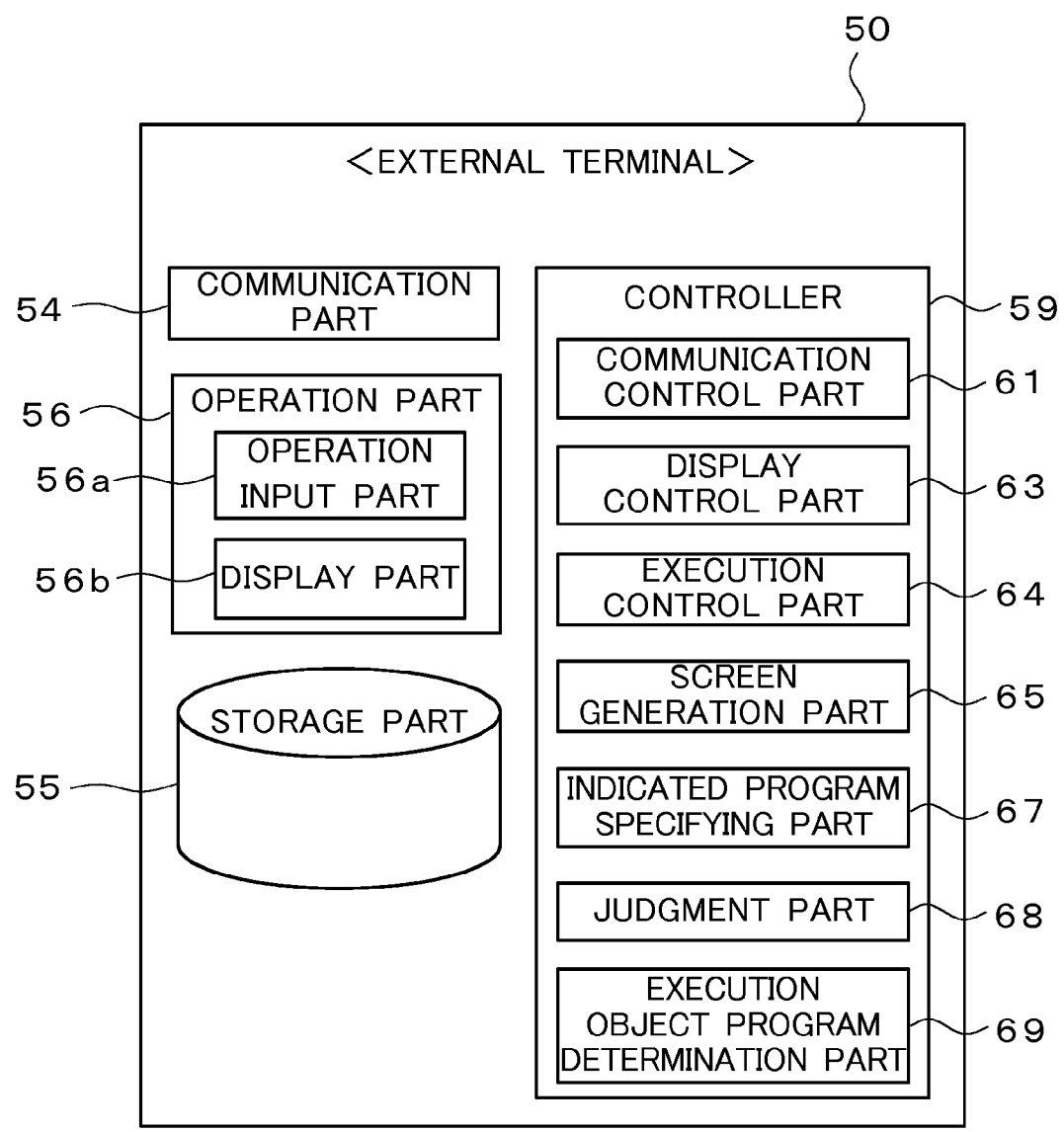
FIG. 12 is a view showing function blocks of an external terminal in accordance with the second preferred embodiment.

FIG. 12 is a view showing function blocks of an external terminal 50 in accordance with the second preferred embodiment.

As shown in FIG. 12, in the second preferred embodiment, the controller 59 implements various processing parts including the communication control part 61, the display control part 63, the execution control part 64, the screen generation part 65, an indicated program specifying part 67, a judgment part 68, and an execution object program determination part 69. Among these processing parts, the processing parts 61, 63, 64, and 65 perform the same operations as those in the first preferred embodiment, respectively.

The indicated program specifying part 67 is a processing part for specifying the program PM1 to which an execution instruction is given through the operation screen GS, out of the programs PG11 and PG12 installed in the image forming apparatus 10, as the indicated program on the basis of the operation input information EM.

The judgment part 68 is a processing part for judging whether or not the program PM2 having the same function as that of the program PM1 is installed in the external terminal 50.

The execution object program determination part 69 is a processing part for determining the program PM2 as the execution object program, instead of the program PM1, on the condition that the program PG2 having the same function as that of the program PM1 is installed in the external terminal 50.

Figure 13:
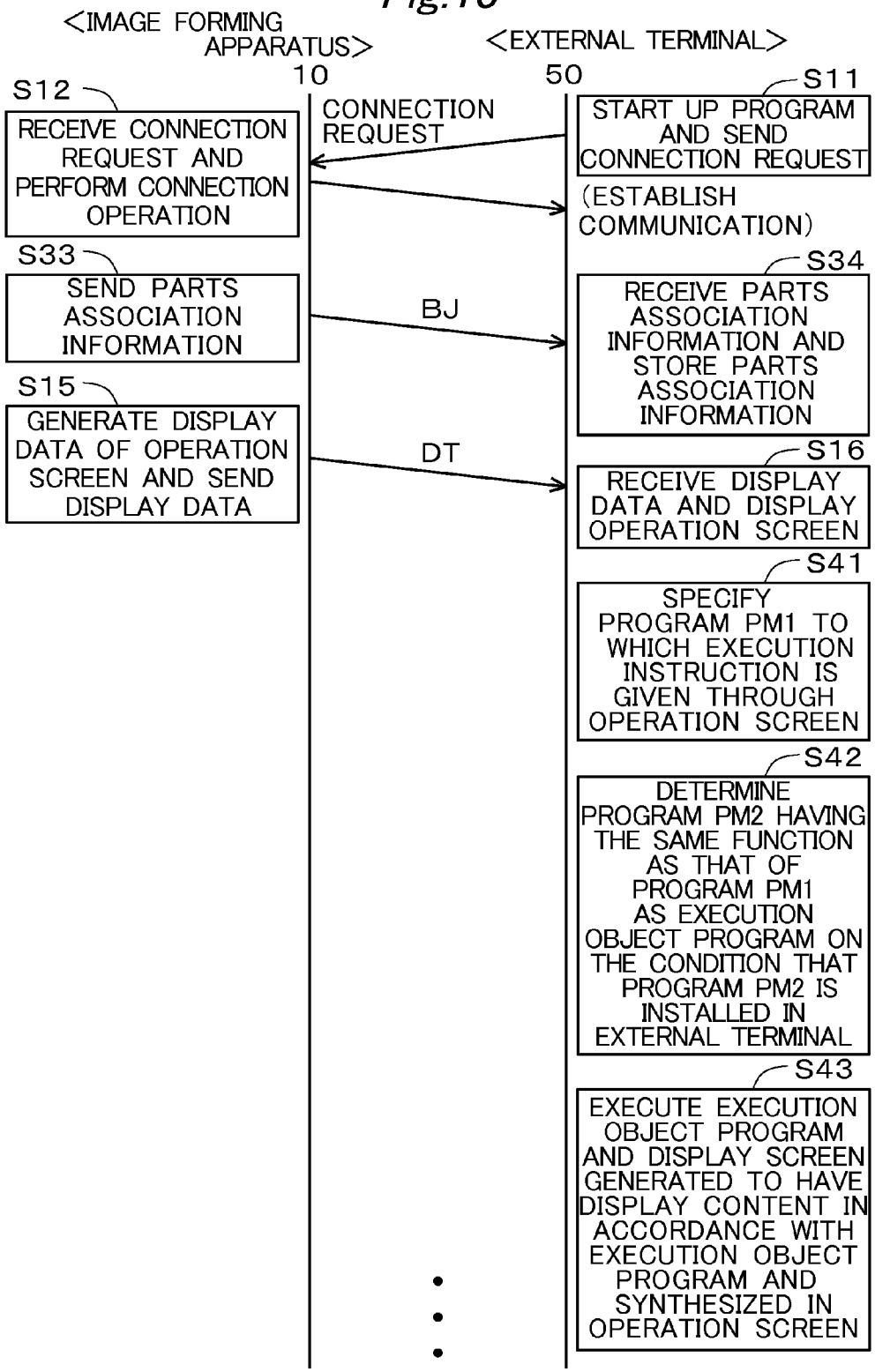
FIG. 13 is a flowchart showing an operation of an image forming system in accordance with the second preferred embodiment.

FIG. 13 is a flowchart showing an operation of an image forming system 1 in accordance with the second preferred embodiment. With reference to FIG. 13, discussion will be made on the operation of the image forming system 1.

First, in Steps S11 and S12, the same operations as those in the first preferred embodiment are executed, and communication connection is thereby established between the image forming apparatus 10 and the external terminal 50.

After that, the image forming apparatus 10 sends parts association information BJ (see FIG. 14) to the external terminal 50 (Step S33). The external terminal 50 receives the parts association information BJ from the image forming apparatus 10 and stores the parts association information BJ in the storage part 55 (Step S34).

FIG. 14 is a view showing the parts association information BJ transmitted from the image forming apparatus 10 to the external terminal 50. The parts association information BJ is information on a plurality of parts ("Menu" key, "Entry 1" key, "Entry 2" key, and the like) constituting the operation screen GS.

As shown in FIG. 14, the parts association information BJ has position information (coordinate information) and program information. The position information includes information of a coordinate position LP of an upper left end of each part having a rectangular shape and a coordinate position RP of a lower right end of the part. Further, the program information includes a program (PG11, PG12, . . . ) corresponding to each part and a function ("WEB browsing function", "PDF creation function", . . . ) of the program.

With reference back to the flowchart of FIG. 13, discussion will continue.

In Steps S15 and S16 of FIG. 13, the same operations as those in the first preferred embodiment are executed, and the operation screen GS1 is generated and displayed on the touch panel 75 of the external terminal 50, as shown in FIG. 7.

After that, the external terminal 50 enters the standby state WS1 for waiting for an operation input from the operator.

Then, when an operation input is received through the operation screen GS, the external terminal 50 specifies a part (hereinafter, also referred to as a selected part SP) which is selected through the operation screen GS on the basis of the operation input information EM on the operation input and the parts association information BJ. Specifically, the external terminal 50 specifies the selected part SP on the basis of a manipulation position in the operation screen GS and the position information in the parts association information BJ. In a case, for example, where the manipulation position in the operation screen GS is included in the rectangular shape of a part (e.g., the "Entry 1" key), the part is specified as the selected SP. Further, with reference to the parts association information BJ, the external terminal 50 specifies a program associated with the selected part SP as the program PM1 to which an execution instruction is given through the operation screen GS (Step S41).

Herein, it is assumed that an operation input of pressing the "Entry 1" key in the operation screen GS1 is received in the above-discussed standby state WS1, like in the first preferred embodiment.

When the "Entry 1" key is pressed, the external terminal 50 specifies the "Entry 1" as the selected part SP on the basis of the parts association information BJ and further specifies the program PG11 (PM1) associated with the "Entry 1" as the indicated program.

After that, the external terminal 50 judges whether or not the program PM2 having the same function (the WEB browsing function) as that of the program PG11 (PM1) is installed in the external terminal 50 on the basis of the function information FJ (see FIG. 4). In this case, since the program PG21 having the "WEB browsing function" is installed in the external terminal 50, it is judged that the program PG21 (PM2) having the same function as that of the program PG11 (PM1) is installed in the external terminal 50.

Then, the external terminal 50 determines the program PG21 (PM2), instead of the program PG11 (PM1), as the execution object program (Step S42).

After that, the external terminal 50 executes the program PG21 (PM2) to generate the WEB browser screen HS1 and displays the new operation screen GS2 on the touch panel 75 (see FIG. 8). The operation screen GS2 is a screen in which the WEB browser screen HS1 is synthesized in the operation screen GS1.

In accordance with the above-discussed operation, the program PM1 (PG11) installed in the image forming apparatus 10 is specified as the indicated program. Subsequently, on the condition that the program PM2 (PG21) having the same function as that of the program PM1 (PG11) is installed in the external terminal 50, the program PM2 (PG21), instead of the program PM1 (PG11), is determined as the execution object program. Then, the external terminal 50 executes the processing in accordance with the program PM2 (PG21) and generates the display screen (HS1) for displaying the result of the processing executed in accordance with the programs PM2. For this reason, when the program PM2 (PG21) is installed in the external terminal 50, it is possible to avoid execution of the program PM1 (PG11) by the image forming apparatus 10. Therefore, it is not necessary to transmit the display data of the display screen for displaying the result of the processing executed in accordance with the program PM1 (PG11) from the image forming apparatus 10 to the external terminal 50, and it is therefore possible to reduce the communication traffic in the network NW between the image forming apparatus 10 and the external terminal 50.

<3. Variations>

Though the preferred embodiments of the present invention have been discussed above, the present invention is not limited to the above-discussed preferred embodiments.

Though the "WEB browsing function" and the "PDF creation function" have been shown as the functions common to the image forming apparatus 10 and the external terminal 50 in the above-discussed preferred embodiments, the common functions are not limited to these functions, and the above-discussed idea may be applied to any other functions common to the image forming apparatus 10 and the external terminal 50.

While the invention has been shown and described in detail, the foregoing description is in all aspects illustrative and not restrictive. It is therefore understood that numerous modifications and variations can be devised without departing from the scope of the invention.

What is claimed is:

1. An image forming system, comprising:
   an image forming apparatus; and
   an external terminal capable of performing communication with said image forming apparatus,
   wherein said image forming apparatus comprises a controller, coupled to a memory, configured to:
   transmit display data of an operation screen to be displayed on said external terminal to said external terminal;
   receive operation input information on an operation input into said operation screen from said external terminal;
   specify a first program to which an execution instruction is given through said operation screen, out of programs installed in said image forming apparatus, on the basis of said operation input information;
   determine a second program as an execution object program instead of said first program if said second program is installed in said external terminal, said second program having the same function as that of said first program and
   notify said external terminal that said second program is determined as said execution object program,
   said external terminal comprises a controller, coupled to a memory, configured to:
   display said operation screen on a display part of said external terminal on the basis of said display data transmitted from said image forming apparatus;
   transmit said operation input information on said operation input into said operation screen to said image forming apparatus;
   execute a processing in accordance with said second program when said external terminal is notified from said image forming apparatus that said second program is determined as said execution object program; and
   generate a display screen for displaying therein a result of said processing executed in accordance with said second program.

2. The image forming system according to claim 1, wherein said controller, coupled to said memory, receives function information on the type of a function of each of programs installed in said external terminal from said external terminal, and judges whether or not said second program having the same function as that of said first program is installed in said external terminal on the basis of said function information.

3. The image forming system according to claim 1, wherein said controller, coupled to said memory, automatically determines the second program.

4. An image forming apparatus, comprising:
   a controller, coupled to a memory, configured to:
   transmit display data of an operation screen to be displayed on an external terminal which is capable of performing communication with said image forming apparatus to said external terminal, to thereby display said operation screen on a display part of said external terminal;
   receive operation input information on an operation input into said operation screen from said external terminal;
   specify a first program to which an execution instruction is given through said operation screen, out of programs installed in said image forming apparatus, on the basis of said operation input information;
   determine a second program as an execution object program instead of said first program if said second program is installed in said external terminal, said second program having the same function as that of said first program; and
   notify said external terminal that said second program is determined as said execution object program, to thereby cause said external terminal to execute a processing in accordance with said second program and generate a display screen for displaying therein a result of said processing executed in accordance with said second program.

5. The image forming apparatus according to claim 4, wherein said controller, coupled to said memory, automatically determines the second program.

6. A non-transitory computer-readable recording medium for recording therein a computer program to be executed by a computer embedded in an image forming apparatus to cause said computer to perform the steps of:
   a) transmitting display data of an operation screen to be displayed on an external terminal which is capable of performing communication with said image forming apparatus to said external terminal, to thereby display said operation screen on a display part of said external terminal;
   b) receiving operation input information on an operation input into said operation screen from said external terminal;
   c) specifying a first program to which an execution instruction is given through said operation screen, out of programs installed in said image forming apparatus, on the basis of said operation input information;
   d) determining a second program as an execution object program instead of said first program if said second program is installed in said external terminal, said second program having the same function as that of said first program; and
   e) notifying said external terminal that said second program is determined as said execution object program, to thereby cause said external terminal to execute a processing in accordance with said second program and generate a display screen for displaying therein a result of said processing executed in accordance with said second program.

7. An image forming system, comprising:
   an image forming apparatus; and
   an external terminal capable of performing communication with said image forming apparatus,
   wherein said image forming apparatus comprises a controller, coupled to a memory, configured to:
   generate display data of an operation screen to be displayed on said external terminal; and
   transmit said display data to said external terminal, and
   said external terminal comprises a controller, coupled to a memory, configured to:
   display said operation screen on a display part of said external terminal on the basis of said display data transmitted from said image forming apparatus;
   specify a first program to which an execution instruction is given through said operation screen, out of programs installed in said image forming apparatus, on the basis of operation input information on an operation input into said operation screen;
   determine a second program as an execution object program instead of said first program if said second program is installed in said external terminal, said second program having the same function as that of said first program;
   execute a processing in accordance with said second program when said determination part determines said second program as said execution object program; and
   generate a display screen for displaying therein a result of said processing executed in accordance with said second program.

8. The image forming system according to claim 7, wherein said controller, coupled to said memory, in said external terminal further:
receives parts association information on a plurality of parts which constitute said operation screen and are associated with a plurality of programs, respectively, which are installed in said image forming apparatus; said parts association information has position information on each of said parts in said operation screen, and
specifies a part selected through said operation screen, on the basis of said operation input information and said parts association information, and specifies a program associated with said part as said first program.

9. The image forming system according to claim 7, wherein said controller, coupled to said memory, automatically determines the second program.

10. An external terminal capable of performing communication with an image forming apparatus, comprising:
a controller, coupled to a memory, configured to:
display an operation screen on, a display part of said external terminal on the basis of display data of said operation screen transmitted from said image forming apparatus;
specify a first program to which an execution instruction is given through said operation screen, out of programs installed in said image forming apparatus, on the basis of operation input information on an operation input into said operation screen;
determine a second program as an execution object program instead of said first program if said second program is installed in said external terminal, said second program having the same function as that of said first program;
execute a processing in accordance with said second program when said determination part controller, coupled to said memory, determines said second program as said execution object program; and
generate a display screen for displaying therein a result of said processing executed in accordance with said second program.

11. The external terminal according to claim 10, wherein said controller, coupled to said memory, automatically determines the second program.

12. A non-transitory computer-readable recording medium for recording therein a computer program to be executed by a computer embedded in an image forming apparatus to cause said computer to perform the steps of:
a) displaying an operation screen on a display part of an external terminal on the basis of display data of said operation screen transmitted from said image forming apparatus capable of performing communication with said external terminal;
b) specifying a first program to which an execution instruction is given through said operation screen, out of programs installed in said image forming apparatus, on the basis of operation input information on an operation input into said operation screen;
c) determining a second program as an execution object program instead of said first program if said second program is installed in said external terminal, said second program having the same function as that of said first program; and
d) executing a processing in accordance with said second program in response to determining said second program as said execution object program and generating a display screen for displaying therein a result of said processing executed in accordance with said second program.

* * * * *